April 1, 1969     E. NOHL ET AL     3,436,162
APPARATUS FOR PRODUCING AND DISCHARGING A FOAM OF A LIQUID
Filed April 11, 1967

Inventors:
EGON NOHL
GERTRUD NOHL
BY:
H. Edward Mastern

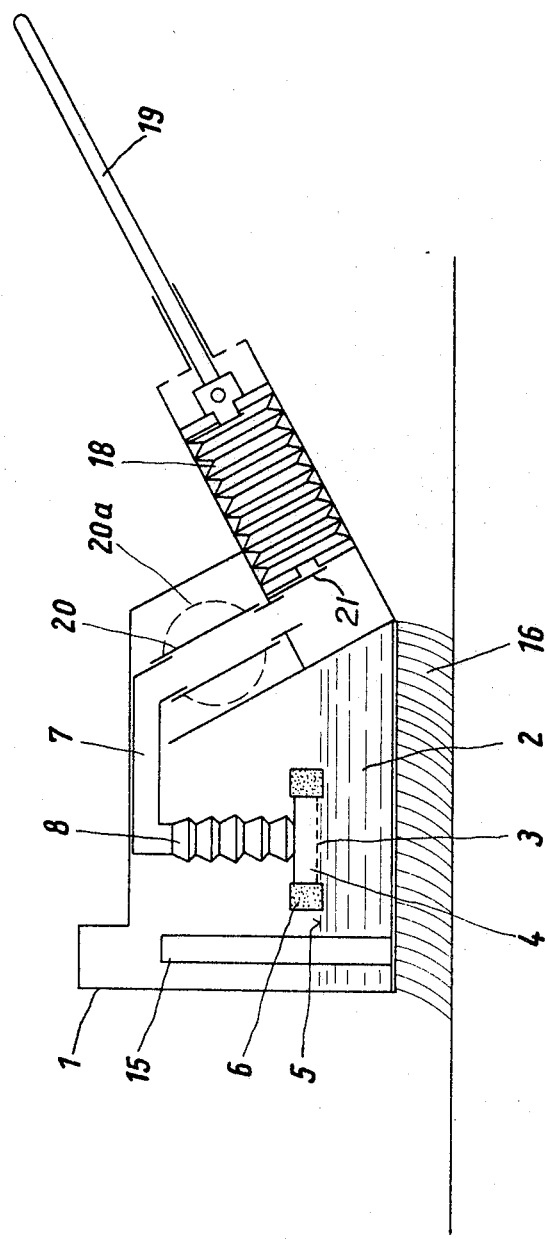

United States Patent Office 3,436,162
Patented Apr. 1, 1969

3,436,162
APPARATUS FOR PRODUCING AND DISCHARGING A FOAM OF A LIQUID
Egon Nohl and Gertrud Nohl, née Köfler, Wiener-Neustadt, Austria, assignors to Rewo Chemische Fabrik G.m.b.H., Schluchtern, Germany, a corporation of Germany
Filed Apr. 11, 1967, Ser. No. 630,105
Claims priority, application Austria, Apr. 19, 1966, A 3,663/66; Apr. 26, 1966, A 3,925/66
Int. Cl. A46b *11/02*
U.S. Cl. 401—188                    12 Claims

ABSTRACT OF THE DISCLOSURE

Apparatus for producing and discharging a foam of a liquid cleaning or treatment agent, comprising a container adapted to receive the liquid in which is retained a hollow body having outlet openings formed therein, and connected to a compressed gas source, the container also having a foam outlet pipe located therein for discharge of the foam, in which the outlet openings of the hollow body are located and kept directly above the liquid to be foamed.

---

Figure 1:
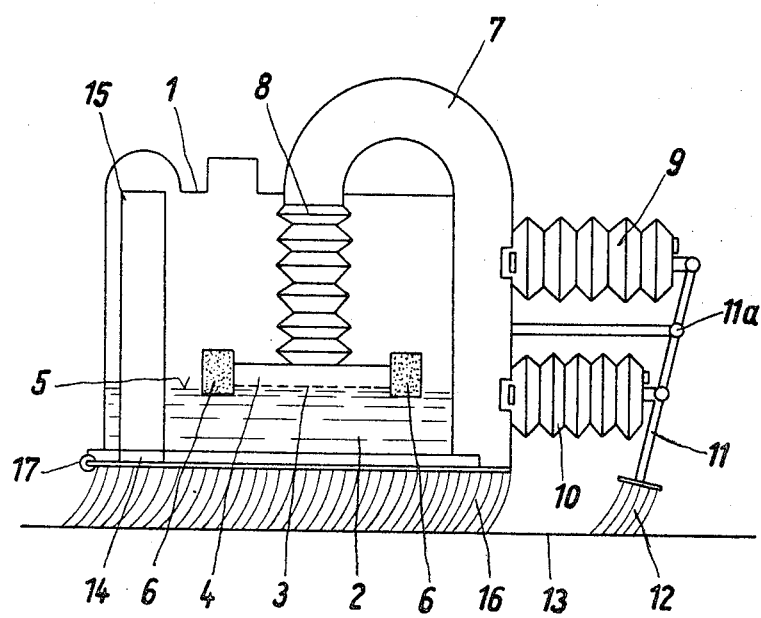

This invention concerns an apparatus for producing and discharging foam of a liquid cleaning or treatment agent.

It has already been proposed, for producing and discharging foam of a liquid cleaning or treatment agent, to use apparatus comprising a container adapted to receive the liquid cleaning or treatment agent in which is retained a pipe having outlet openings formed therein which pipe is connected to a compressed air or pressure source, the pipe being immersed in the liquid cleaning or treatment agent, and said container also having located therein a funnel-shaped foam outlet pipe for discharge of the foam, which pipe is located above the surface of the liquid cleaning or treatment agent.

This apparatus, however, requires a relatively high gas pressure and is therefore dependent upon a relatively powerful compressed gas source, for example, a compressed air cylinder, a vacuum cleaner or the like compressed gas source, which when operating with the foam producing device, has to be constantly carried along therewith.

It is an object of the present invention to provide an apparatus for producing and discharging foam formed in the apparatus independent of a stationary or mechanical compressed air source, i.e. an apparatus permitting an effective charging of compressed air into the liquid by means of a manually operated compressed air generator, which replaces the mechanical compressed air source.

Accordingly, the invention consists in that a hollow body, for example, a perforated pipe connected to the compressed gas source and having air outlet openings formed therein, is provided in the container, the openings of the pipe being located directly above the liquid to be foamed at least over a portion of the surface of the liquid. The openings located above the liquid in this case have a blowing direction conveniently directed substantially vertically to the surface of the liquid.

The apparatus developed in accordance with the invention and hereinafter called "Shampooner" for producing and discharging foam, relative to known shampooners which have as foam generator a pipe having a perforated outer surface which projects into the liquid, permits a more intensive utilization of the air supplied, since on the one hand, the air does not have to displace a liquid column formed in the pipe, and on the other hand, after the liquid level has dropped, the air can no longer escape unused through the exposed apertures. Foaming in the container, moreover, commences immediately air is supplied to the foam generator and more especially relative to known shampooners foaming requires a substantially lesser air pressure.

The hollow body serving as the foam generator is conveniently arranged so as to be vertically adjustable in the container, for which purpose the hollow body is provided with floats for example, and is adapted to be connected to the air supply pipe by means of a bellows-like hose section. Changes of level of the liquid surface occurring during operation in the container, and locational changes of the hollow body or its air outlet openings, are readily compensated thereby, and hence the hollow body is constantly retained at the same distance and same position relative to the liquid surface.

The compressed air generator may be a manually actuated compressed air generator which is fixedly connected to the container. Thus, for example, the compressed air generator may comprise a manually actuated air bellows or like air bellows, which is or are actuated by means of a pivot lever secured with its free end to the apparatus body and being in sliding engagement with a material or article to be treated. On the free end of the pivot lever sliding along the article being treated in this case a bristle bar is arranged with the aid of which the friction on the article being treated, and hence the force transmitted to the air bellows, may be increased.

In a further preferred embodiment the orifice of the foam outlet pipe located above the article being treated may be surrounded by a ring of vertically flexible bristles disposed at least in the proximity of the bristle bar.

The compressed air generator, however, may also comprise an air bellows, air cylinder or the like compressed air generator, the connecting rod or bellows rod of which forms the actuating element for the shampooner. In this case, when displacing the shampooner over the article being treated, for example, a carpet, the air cylinder or the air bellows are actuated simultaneously and hence compressed air is fed into the shampooner. The air cylinder or the air bellows may be formed as a double acting cylinder, so that both when moving the shampooner in one direction and moving the shampooner in the other direction compressed air is produced. It is, however, also possible to arrange an air vessel-like member, for example a flexible inflatable hollow body between the air bellows or the air cylinder on the one hand and the hollow body on the other hand, whereby a compressed air stream, compensated over a period, may be brought about. Naturally, it is possible for both means, i.e. a double acting air cylinder in conjunction with a flexible inflatable hollow body to be provided.

The invention is illustrated by way of example with reference to the accompanying drawings in which:

FIG. 1 shows a schematic view of an apparatus for producing and discharging foam formed from liquid cleaning or treatment agents in accordance with the invention; and FIG. 2 shows a schematic view of an alternative embodiment of an apparatus in accordance with the invention.

In accordance with the invention a pipe 4 connected to a compressed gas source and having air outlet openings 3 formed therein, which openings 3 are located above the surface 5 of the liquid 2 to be foamed, is provided in the container 1. The openings 3 have a blowing direction substantially vertical against the liquid surface 5. The pipe 4 is arranged in the container so as to be vertically adjustable for which purpose the pipe is provided with floats 6 and connected with the air supply tube 7 by means of a bellows-shaped hose member 8. This permits vertical and positional changes occurring during operation of the liquid level 5 in the container to be automatically compensated.

As compressed air generator there is provided a manually actuated compressed air generator firmly connected to the container. In the embodiment shown in FIG. 1 the compressed air generator comprises two manually actuated air bellows 9 and 10 which are actuated by means of a pivot lever 11 mounted on the apparatus body, the free end of the lever having mounted thereon a bristle bar 12 in sliding engagement along the article to be treated 13. The orifice 14 of the foam outlet pipe 15 located over the article being treated is enclosed by a ring of bristles 16 vertically resilient at least in the proximity of the bristle bar 12, for which purpose the latter is pivotally mounted by means of a hinge 17.

Reciprocating the apparatus causes the pivot lever 11 owing to the friction occurring between the bristle bar 12 and the article being treated 13 also to be reciprocated about its hinge point 11a, whereby the air bellows 9 and 10 feeding air into the pipe 4, are alternately compressed. The compressed air emanating from the openings 3 of pipe 4 enters the liquid 2, and in this way produces foam, which by action of the air is applied to the article being treated via the discharge pipe 15. The ring of bristles 16 assists the discharged foam to be worked into the article being treated. Owing to the vertical resilience of the ring of bristles 16, an dits articulation effected by the hinge 17 that permits angular movement of the container 1 relative to the ring of bristles 16 about the hinge 17, the bristle bar 12, in spite of its arcuate movement about the pivot 11a, in all positions thus is pressed with constantly adequate force against the article being treated.

In the embodiment shown in FIG. 2, in which the same components receive the same reference numerals, an air bellows 18 is provided as air generator, the bellows rod 19 of which forms the actuating element for the apparatus. To obtain a timed distribution of the compressed air produced intermittently by means of the supply pipe 7 a flexible inflatable hollow body 20 is provided.

The action of this embodiment is basically identical to that shown in FIG. 1. With a reciprocating actuation of the apparatus the air bellows 18 is alternately compressed and expanded, with each pressure stroke air being fed via the pipe 7 and the hose member 8 into the pipe. The flexible inflatable hollow body 20 is inflated simultaneously by means of the excess air to assume its shape 20a shown in broken lines. Any return flow of the air from the body 20 into the bellows 18 is prevented by the flap valve 21. The air consequently stored in the body 20 is conveyed into the apparatus during the suction stroke of the air bellows 18 from the hollow body 20, thereby obtaining a quantity and pressure distribution of air over a predetermined period.

In place of a single air bellows it is also possible in accordance with the embodiment shown in FIG. 1 to provide two opposing air bellows or a double acting air bellows or air cylinder.

We claim:

1. Apparatus for producing and discharging a foam of a liquid, selected from cleaning and treatment agents, comprising a container adapted to receive the liquid, a hollow body having outlet openings formed therein, a compressed gas source connected to said hollow body, a foam outlet pipe located in said container for discharge of the foam, and means for supporting said hollow body in said container such that said outlet openings of said hollow body are located directly above the liquid to be foamed.

2. Apparatus as recited in claim 1, in which said hollow body is a perforated pipe, the wall of which defines said outlet openings.

3. Apparatus as recited in claim 1, in which said hollow body is so located that said outlet openings have a blowing direction substantially vertical against the surface of the liquid.

4. Apparatus as recited in claim 1, said means comprising floats attached to said hollow body for raising or lowering said hollow body and an air supply pipe fed from said source and connected to said hollow body by means of a bellows-shaped hose member.

5. Apparatus as recited in claim 1 in which said compressed gas source is a manually actuated compressed air generator, and means for fastening said generator to said container.

6. Apparatus as recited in claim 1 in which said compressed gas source is at least one manually actuated air bellows, a pivot lever being connected to said container to actuate said air bellows, and the free end of said pivot lever being in sliding arrangement with an article to be treated.

7. Apparatus as recited in claim 6 in which a bristle bar is attached to the free end of said pivot lever said free end of said pivot lever thereby sliding in frictional engagement over an article to be treated.

8. Apparatus as recited in claim 7 in which a ring of vertically flexible bristles disposed at least in the proximity of said bristle bar encloses the orifice of said foam outlet pipe located over the article to be treated.

9. Apparatus as recited in claim 8, in which said ring of bristles is secured to said container by means of a pivot hinge.

10. Apparatus as recited in claim 6 in which an inflatable member is connected to said compressed gas source and to said hollow body.

11. Apparatus as recited in claim 10, in which said member is a flexible inflatable hollow body.

12. Apparatus as recited in claim 1, in which said compressed gas source comprises two oppositely acting air bellows, with an actuating rod connected to both bellows.

References Cited

UNITED STATES PATENTS 2,293,722  8/1942  Erickson.
3,120,676  2/1964  Ballantyne _____ 401—47

EDWARD L. ROBERTS, *Primary Examiner.*

U.S. Cl. X.R.

15—50; 55—230, 469; 261—120